United States Patent
Noh et al.

(10) Patent No.: US 7,639,126 B2
(45) Date of Patent: Dec. 29, 2009

(54) APPARATUS FOR LIGHTING BRAKE LAMP FOR VEHICLE USING NON-CONTACTLESS SWITCH

(75) Inventors: Jong Sang Noh, Ulsan (KR); Jong Geun Cha, Ulsan (KR); Jung Min Lee, Busan (KR)

(73) Assignee: Donghee Industrial Co., Ltd., Ulsan Metropolitan (KR)

( * ) Notice: Subject to any disclaimer, the term of this patent is extended or adjusted under 35 U.S.C. 154(b) by 283 days.

(21) Appl. No.: 11/648,934

(22) Filed: Jan. 3, 2007

(65) Prior Publication Data

US 2007/0152805 A1    Jul. 5, 2007

(30) Foreign Application Priority Data

Jan. 4, 2006    (KR) ..................... 10-2006-0000984

(51) Int. Cl.
*B60Q 1/44* (2006.01)
(52) U.S. Cl. ....................... 340/479; 340/468
(58) Field of Classification Search ................. 340/479, 340/468; 362/487
See application file for complete search history.

(56) References Cited

U.S. PATENT DOCUMENTS

| | | | |
|---|---|---|---|
| 3,921,750 A | 11/1975 | Shames | |
| 4,170,723 A | 10/1979 | Arsoy | |
| 7,298,261 B2* | 11/2007 | Fujimori et al. | ............. 340/551 |
| 2006/0125617 A1* | 6/2006 | Zimmermann | ............. 340/467 |

FOREIGN PATENT DOCUMENTS

| | | |
|---|---|---|
| EP | 0 680 863 | 11/1995 |
| EP | 0 927 661 | 7/1999 |
| JP | 10-53184 | 2/1998 |
| JP | 10-278613 | 10/1998 |

* cited by examiner

*Primary Examiner*—Jeffery Hofsass
(74) *Attorney, Agent, or Firm*—Hamre, Schumann, Mueller & Larson, P.C.

(57) ABSTRACT

The present invention provides an apparatus for lighting a brake lamp for a vehicle. The apparatus includes a brake pedal arm including a brake pedal at one end thereof, a pedal arm stop bracket integrally formed on the brake pedal arm at the upper side of the brake pedal arm, and a non-contacting switch that is separated from or comes in contact with the pedal arm stop bracket so as to be turned on or off depending on the operation of the brake pedal.

6 Claims, 6 Drawing Sheets

APPARATUS FOR LIGHTING BRAKE LAMP FOR VEHICLE USING NON-CONTACTLESS SWITCH

BACKGROUND OF THE INVENTION

1. Field of the Invention

The present invention relates to an apparatus for lighting a brake lamp for a vehicle using a non-contacting switch, and more particularly to an apparatus for lighting a brake lamp for a vehicle using a non-contacting switch that uses a proximity switch, that is, a non-contacting switch to control the lighting of a brake lamp depending on the operation of the brake pedal of a vehicle.

2. Description of the Related Art

As shown in FIG. 1A, an apparatus for lighting a brake lamp for a vehicle in the related art includes a brake pedal arm 3 including a brake pedal 1 at one end thereof, a pedal arm stop bracket 5 integrally formed on the brake pedal arm at the upper side of the brake pedal arm 3, and a switch 7 that includes mechanical contacts and is turned on or off depending on the operation of the brake pedal.

The operation of the switch including mechanical contacts will be described below. As shown in FIG. 1B and FIG. 1C that is a view of the switch as seen from the line A-A of FIG. 1B, before the brake pedal is operated, due to a return spring of the brake pedal, the pedal arm stop bracket integrally formed on the pedal arm pushes up a shaft 8, which is made of plastic, of the switch 7. For this reason, a spring 9 is compressed, and a first contact A comes in contact with a second contact B. Further, a third contact C and fourth contact D, which have come in contact with each other, are separated from each other. In contrast, when the brake pedal is operated, the pedal arm stop bracket is separated from the shaft 8 of the switch 7 and the first and second contacts A and B are separated from each other. Further, the third and fourth contacts C and D come in contact with each other. As a result, the brake lamp is lighted.

However, as the above-mentioned operation is repeated, the contacts repeatedly come in contact with each other, so that the contacts are worn away. Accordingly, there is an undesirable possibility that the brake lamp is not lighted. For this reason, a driver of a vehicle behind cannot perceive a braking signal. As a result, there is a problem that accidents occur. Further, in the case of the switch including mechanical contacts, when the brake pedal is operated, noise occurs due to the spring provided in the switch. As a result, there is a problem that the driver loses concentration.

SUMMARY OF THE INVENTION

The present invention has been made to resolve the above-mentioned problems, and an object of the present invention is to provide an apparatus for lighting a brake lamp for a vehicle using a non-contacting switch that uses a high-frequency type non-contacting switch to control the lighting of a brake lamp depending on the operation of the brake pedal of a vehicle.

Another object of the present invention is to provide an apparatus for lighting a brake lamp for a vehicle using a non-contacting switch that uses a capacitance type non-contacting switch to control the lighting of a brake lamp depending on the operation of the brake pedal of a vehicle.

In order to accomplish the above objects, the present invention provides an apparatus for lighting a brake lamp for a vehicle. The apparatus includes a brake pedal arm including a brake pedal at one end thereof, a pedal arm stop bracket integrally formed on the brake pedal arm at the upper side of the brake pedal arm, and a non-contacting switch that is separated from or comes in contact with the pedal arm stop bracket so as to be turned on or off depending on the operation of the brake pedal.

In the above-mentioned apparatus, the non-contacting switch may be a proximity sensor, and may be a high-frequency type non-contacting switch or capacitance type non-contacting switch.

BRIEF DESCRIPTION OF THE DRAWINGS

The above mentioned and other features including advantages of the present invention will become more apparent by describing in detail preferred embodiments thereof with reference to the attached drawings in which.

DESCRIPTION OF THE PREFERRED EMBODIMENTS

Hereinafter, a preferred embodiment of the present invention will be described with reference to the accompanying drawings.

Embodiment

The structure of an apparatus for lighting a brake lamp for a vehicle according to this embodiment will be described with reference to FIG. 2.

Figure 1A:
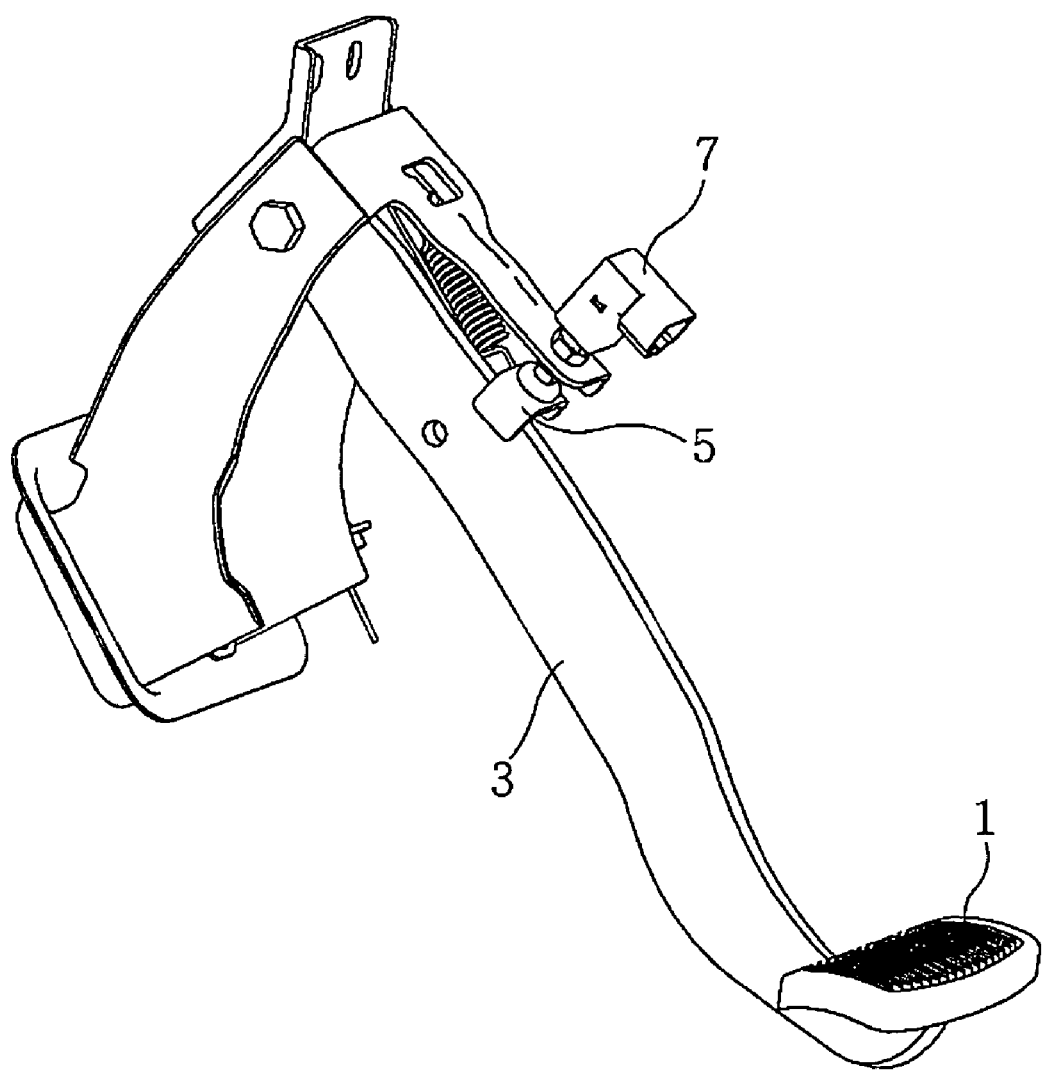
FIG. 1A is a perspective view of an apparatus for lighting a brake lamp for a vehicle in the related art.
Figure 1B:
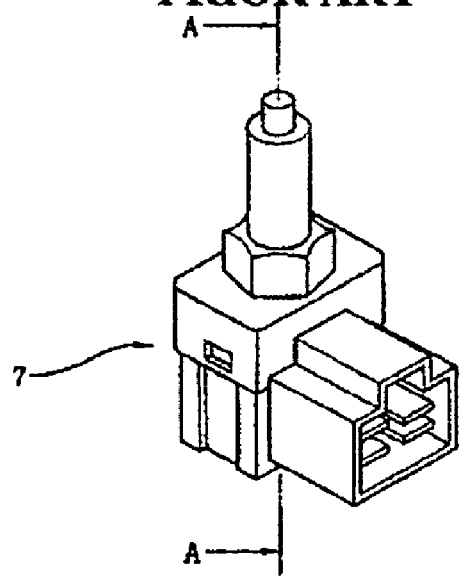
FIG. 1B is a perspective view of a switch of the apparatus for lighting a brake lamp for a vehicle in the related art.
Figure 1C:
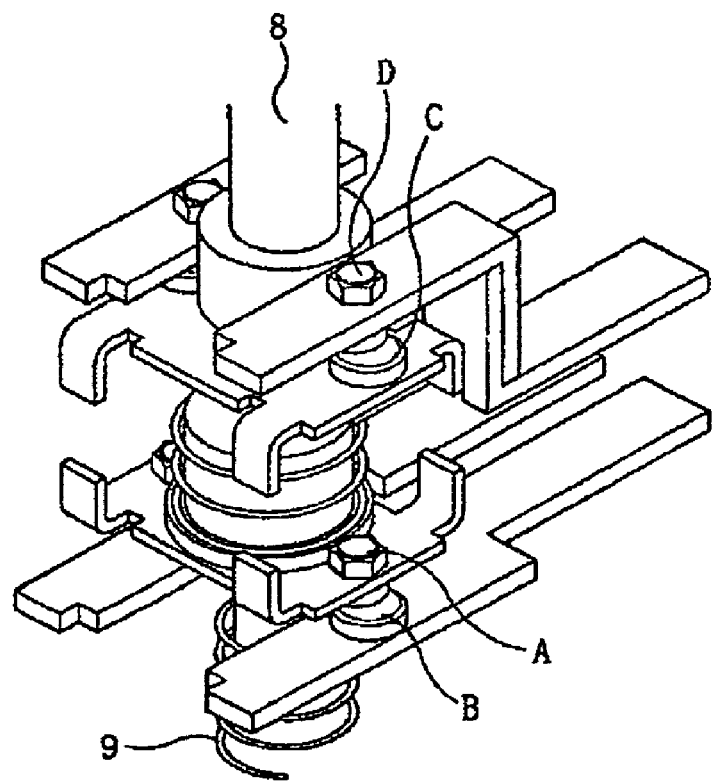
FIG. 1C is a view of the switch as seen from the line A-A of FIG. 1B.
Figure 2:
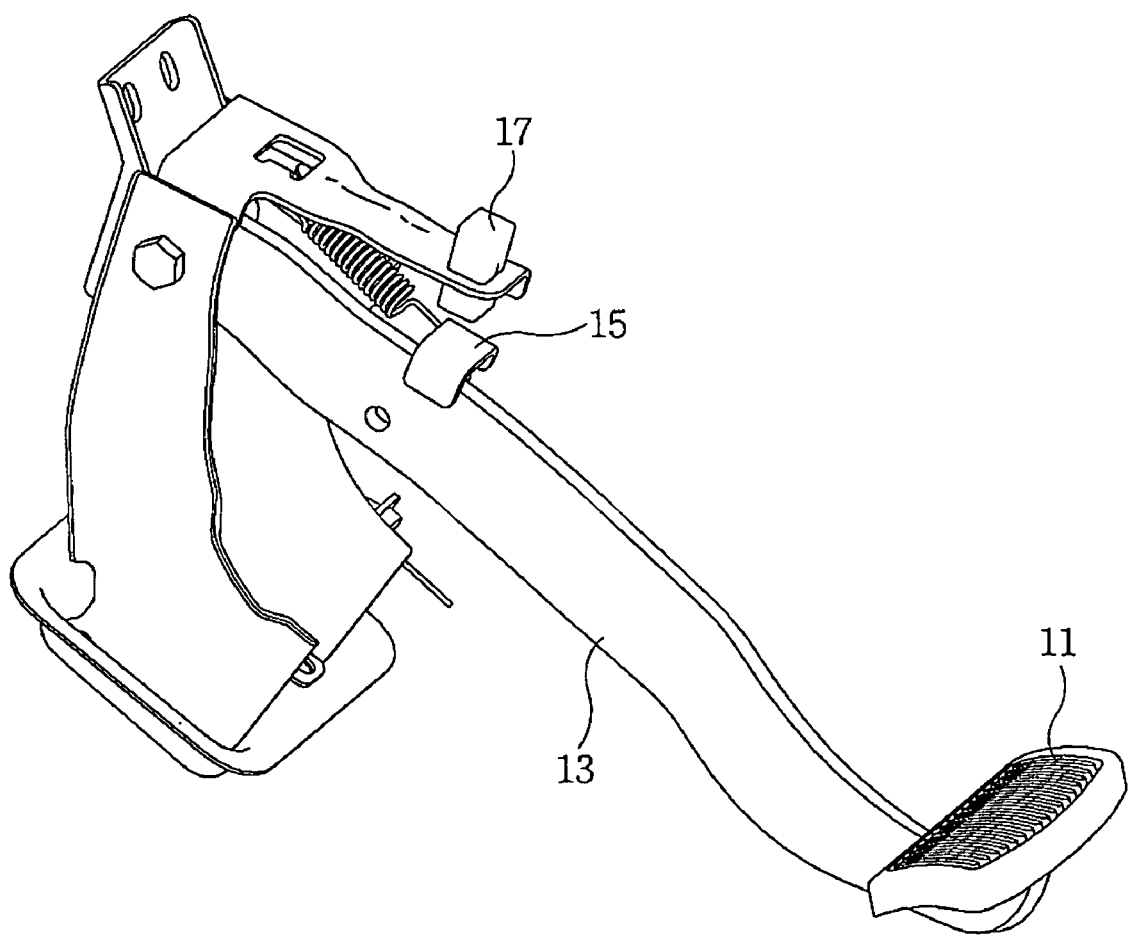
FIG. 2 is a perspective view of an apparatus for lighting a brake lamp for a vehicle according to the present invention.

As shown in FIG. 2, an apparatus for lighting a brake lamp according to this embodiment includes a brake pedal arm 13 including a brake pedal 11 at one end thereof, a pedal arm stop bracket 15 integrally formed on the brake pedal arm at the upper side of the brake pedal arm 13, and a non-contacting switch 17 that is separated from or comes in contact with the pedal arm stop bracket 15 so as to be turned on or off depending on the operation of the brake pedal 11.

In the above-mentioned structure, it is preferable that the pedal arm stop bracket 15 according to this embodiment be made of ferromagnetic metal.

Figure 3A:
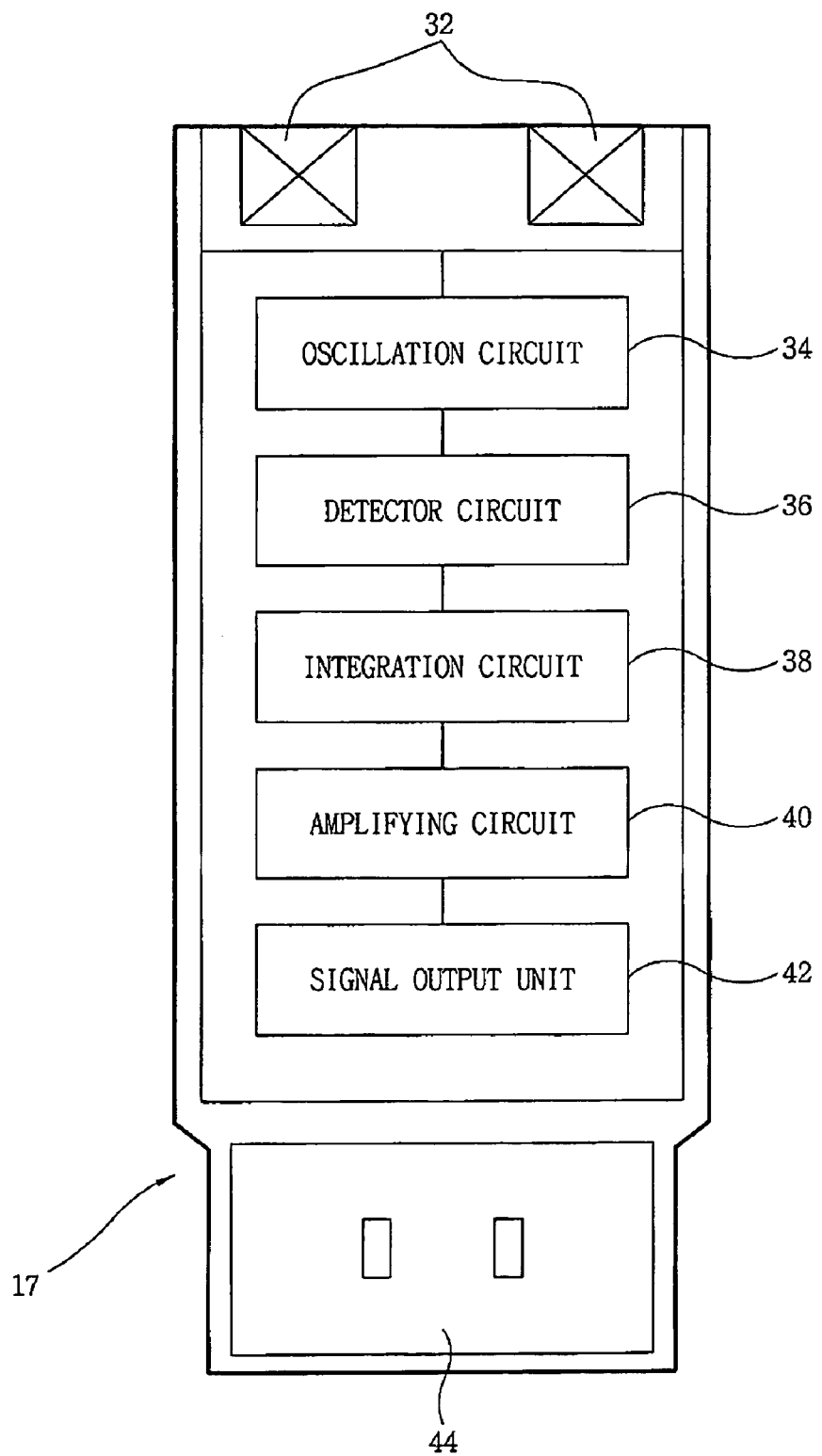
FIG. 3A is a view showing the configuration of a high-frequency type brake switch according to the present invention.
Figure 3B:
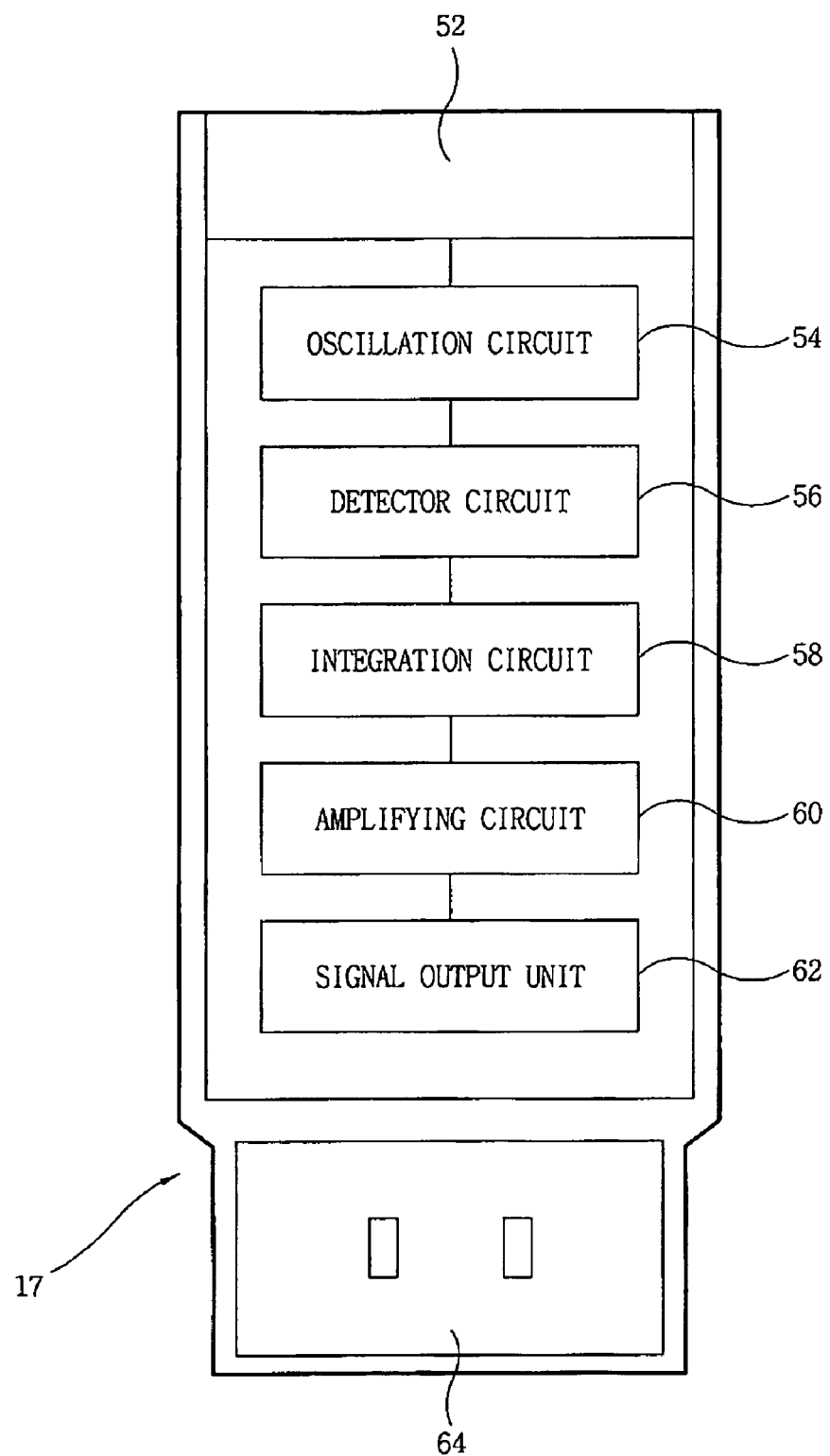
FIG. 3B is a view showing the configuration of a capacitance type brake switch according to the present invention.

Further, the non-contacting switch according to this embodiment is a proximity sensor, and may be a high-frequency type non-contacting switch or capacitance type non-contacting switch. The types of the non-contacting switch are shown in FIGS. 3A and 3B.

First, the configuration and operation of a high-frequency type non-contacting switch 17 will be described below with reference to FIG. 3A. After power is applied from a battery, a high frequency magnetic field depending on the operation of the brake pedal is generated by an electromagnetic coil 32. As a result, an oscillation circuit 34 is oscillated in a predetermined frequency band due to the magnetic field generated by the electromagnetic coil 32. The change of the magnetic field caused by the oscillation of the oscillation circuit 34 is detected by a detector circuit 36, and is then converted into a current signal by an integration circuit 38. The current signal converted by the integration circuit 38 is amplified by an amplifying circuit 40, and then output by a signal output unit 42. Subsequently, the signal is output through a connector 44 that is connected to a brake lamp and an ECU of a vehicle.

Meanwhile, the configuration and operation of the capacitance type non-contacting switch 17 will be described below with reference to FIG. 3B. After power is applied from a battery, positive charges depending on the operation of the brake pedal is generated by a charge generator (so-called pole plate) 52. Then, an oscillation circuit 54 is oscillated in a predetermined frequency band due to the positive charges generated by the charge generator 52. The change in capacitance caused by the oscillation of the oscillation circuit 54 is detected by a detector circuit 56, and is then converted into a current signal by an integration circuit 58. The current signal converted by the integration circuit 58 is amplified by an amplifying circuit 60, and then output by a signal output unit 62. Subsequently, like the high-frequency type non-contacting switch, the signal is output through a connector 64 that is connected to a brake lamp and an ECU of a vehicle.

The signal output unit of the non-contacting switch according to this embodiment includes a buffer circuit and a NOT circuit of a C-MOS, and a final output signal is output in a manner in which ON/OFF signals are simultaneously output by two power transistors.

The operation of the apparatus for lighting a brake lamp for a vehicle, which has the above-mentioned configuration, will be described below with reference to FIGS. 4, 3A, and 3B.

Figure 4:
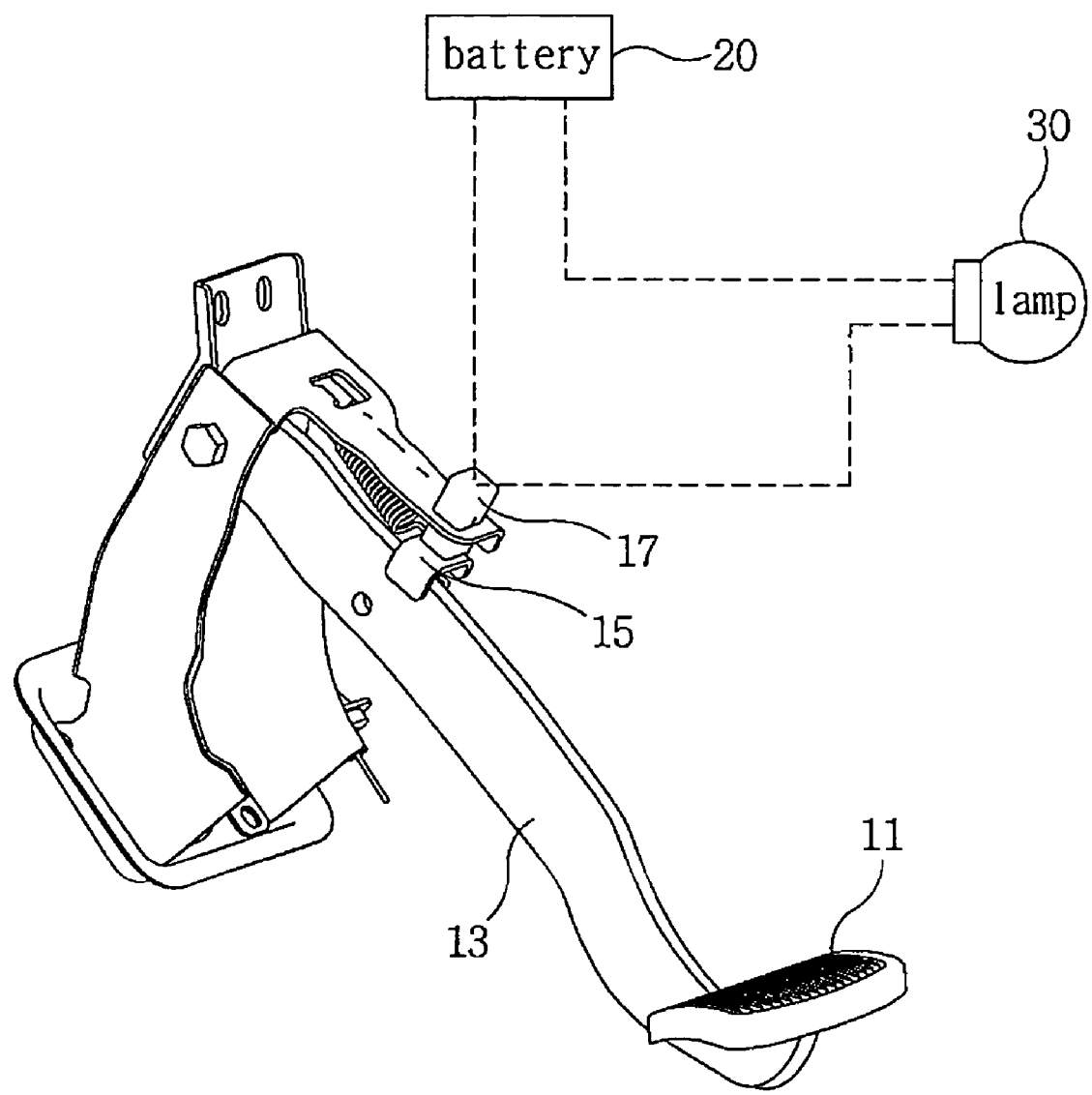
FIG. 4 is a view showing the signal connection of the apparatus for lighting a brake lamp for a vehicle according to the present invention.

As shown in FIG. 4, first, in the case of a high-frequency type non-contacting switch 17, when power is applied to the non-contacting switch 17 from the battery 20 of a vehicle and the brake pedal 11 is not operated, that is, when the pedal arm stop bracket 15 comes in contact with the non-contacting switch 17, a magnetic field opposite to a magnetic field generated by the electromagnetic coil of the non-contacting switch 17 is formed due to eddy current generated between the pedal arm stop bracket 15 and the non-contacting switch 17. For this reason, the amplitude of waves generated by the oscillation circuit of the non-contacting switch 17 is reduced or the waves disappear. As a result, the switch is turned off, that is, an OFF signal is supplied to the brake lamp 30 so that the lamp is turned off. Meanwhile, when the OFF signal is supplied to the brake lamp, an ON signal is supplied to the ECU of a vehicle. For this reason, it is possible to detect the operation of the brake system. In contrast, when the brake pedal 11 is operated, the pedal arm stop bracket 15 is separated from the non-contacting switch 17, so that the eddy current generated between the pedal arm stop bracket 15 and the non-contacting switch 17 is removed. Accordingly, the frequency of waves generated from the oscillation circuit of the non-contacting switch 17 is affected by power to be applied. As a result, the switch is turned on. That is, since an ON signal is supplied to the brake lamp 30 from the non-contacting switch 17, the lamp is turned on. Even in this case, a signal is supplied to the ECU of the vehicle as described above, and the supplied signal is a signal opposite to the signal supplied to the brake lamp, that is, an OFF signal.

Meanwhile, the operation principle of a capacitance type non-contacting switch is the same as that of the high-frequency type non-contacting switch, but the contact or separation between the pedal arm stop bracket and the non-contacting switch is reversely performed.

That is, in the case where power is applied to the non-contacting switch 17 from the battery 20 of the vehicle, when the brake pedal 11 is not operated and the pedal arm stop bracket 15 comes in contact with the non-contacting switch 17, negative charges are generated in the pedal arm stop bracket 15 of non-contacting switch 17 facing the charge generator (pole plate). Accordingly, capacitance is increased due to the polarization between the negative charges and the positive charges generated by the charge generator of the non-contacting switch 17. In contrast, when the polarization occurs and the pedal arm stop bracket 15 is separated from the non-contacting switch 17 due to the operation of the brake pedal 11, the capacitance is decreased. In this case, the OFF signal of the non-contacting switch 17 is supplied to the ECU of the vehicle, and the ON signal of the non-contacting switch 17 output simultaneously with the OFF signal is supplied to the brake lamp 30. As a result, the lamp is turned on.

Modification

According to a modification of the present invention, since the structure described in the embodiment in which the pedal arm stop bracket and non-contacting switch are mounted on the brake pedal arm is applied to a clutch pedal, it is possible to detect an operation signal of the clutch pedal by non-contacting switch. Since the structure required to achieve this is the same as that of the apparatus for lighting a brake lamp according to the embodiment, the detailed description thereof will be omitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

According to an apparatus for lighting a brake lamp for a vehicle using a non-contacting switch of the present invention, since a non-contacting switch is used instead of a switch having mechanical contacts, a driver of a vehicle behind can perceive a signal caused by a reliable lighting of a brake lamp. As a result, it is possible to prevent the occurrence of accidents, and to improve the driver's concentration during the driving of a vehicle.

What is claimed is:

1. An apparatus for lighting a brake lamp for a vehicle using a non-contacting switch, the apparatus comprising:
   a brake pedal arm including a brake pedal at one end thereof;
   a pedal arm stop bracket integrally formed on the brake pedal arm at the upper side of the brake pedal arm; and
   a high-frequency type non-contacting switch that is separated from or comes in contact with the pedal arm stop bracket so as to be turned on or off depending on the operation of the brake pedal,
   wherein the non-contacting switch is a proximity sensor, and
   wherein the high-frequency type non-contacting switch includes:
   an electromagnetic coil generating a high frequency magnetic field depending on the operation of the brake pedal, after power is applied from a battery;
   an oscillation circuit oscillated in a predetermined frequency band due to the magnetic field generated by the electromagnetic coil;
   a detector circuit detecting the change of the magnetic field caused by the oscillation of the oscillation circuit;
   an integration circuit converting the change of the magnetic field detected by the detector circuit into a current signal;

an amplifying circuit amplifying the current signal converted by the integration circuit;

a signal output unit outputting the signal amplified by the amplifying circuit; and a connector through which the signal output from the signal output unit is transmitted to a brake lamp and an ECU of a vehicle.

2. An apparatus for lighting a brake lamp for a vehicle using a non-contacting switch, the apparatus comprising:

a brake pedal arm including a brake pedal at one end thereof;

a pedal arm stop bracket integrally formed on the brake pedal arm at the upper side of the brake pedal arm; and a capacitance type non-contacting switch that is separated from or comes in contact with the pedal arm stop bracket so as to be turned on or off depending on the operation of the brake pedal, wherein the non-contacting switch is a proximity sensor, and wherein the capacitance type non-contacting switch includes:

a charge generator generating positive charges depending on the operation of the brake pedal, after power is applied from a battery;

an oscillation circuit oscillated in a predetermined frequency band due to the positive charges generated by the charge generator;

a detector circuit detecting the change in capacitance caused by the oscillation of the oscillation circuit;

an integration circuit converting the change in capacitance detected by the detector circuit into a current signal;

an amplifying circuit amplifying the current signal converted by the integration circuit;

a signal output unit outputting the signal amplified by the amplifying circuit; and a connector through which the signal output from the signal output unit is transmitted to a brake lamp and an ECU of a vehicle.

3. The apparatus as set forth in claim 1, wherein the signal output unit includes a buffer circuit and a NOT circuit of a C-MOS, and a final output signal is output in a manner in which ON/OFF signals are simultaneously output by two power transistors.

4. The apparatus as set forth in claim 2, wherein the signal output unit includes a buffer circuit and a NOT circuit of a C-MOS, and a final output signal is output in a manner in which ON/OFF signals are simultaneously output by two power transistors.

5. The apparatus as set forth in claim 1, wherein the pedal arm stop bracket is made of ferromagnetic metal.

6. The apparatus as set forth in claim 2, wherein the pedal arm stop bracket is made of ferromagnetic metal.

* * * * *